(12) United States Patent
Kang et al.

(10) Patent No.: US 12,496,993 B2
(45) Date of Patent: Dec. 16, 2025

(54) COLLISION ACCIDENT RESPONSE SYSTEM AND METHOD FOR A VEHICLE

(71) Applicants: HYUNDAI MOTOR COMPANY, Seoul (KR); KIA CORPORATION, Seoul (KR)

(72) Inventors: Seung-Kyu Kang, Hwaseong-si (KR); Jong-Hun Choi, Incheon (KR); Dae-Hyun Choi, Ansan-si (KR); Eun-Mook Park, Suwon-si (KR); Han-Jo Jeong, Uiwang-si (KR); Sung-Ung Ryu, Seoul (KR); Seoung-Hyun Lee, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 233 days.

(21) Appl. No.: 18/517,554

(22) Filed: Nov. 22, 2023

(65) Prior Publication Data

US 2025/0026292 A1 Jan. 23, 2025

(30) Foreign Application Priority Data

Jul. 21, 2023 (KR) .................. 10-2023-0095244

(51) Int. Cl.
*B60R 21/0136* (2006.01)
*G08G 1/00* (2006.01)
*B60R 21/013* (2006.01)

(52) U.S. Cl.
CPC ......... *B60R 21/0136* (2013.01); *G08G 1/205* (2013.01); *B60R 2021/01302* (2013.01)

(58) Field of Classification Search
CPC .................. B60R 2021/0027; B60R 2021/006
USPC ............................................. 701/45
See application file for complete search history.

(56) References Cited

U.S. PATENT DOCUMENTS

| | | | | |
|---|---|---|---|---|
| 3,737,193 | A * | 6/1973 | Cain | B60R 21/00 49/141 |
| 5,309,767 | A * | 5/1994 | Parmar | G01L 9/0077 250/231.19 |
| 5,556,493 | A * | 9/1996 | Teder | B29C 65/48 156/286 |
| 7,475,587 | B2 * | 1/2009 | Kithil | G01L 5/0052 73/12.09 |
| 9,969,344 | B1 * | 5/2018 | Kolasiński | G08G 1/205 |
| 10,071,732 | B2 * | 9/2018 | Dudar | G05D 1/0212 |

(Continued)

FOREIGN PATENT DOCUMENTS

| | | |
|---|---|---|
| CA | 2227664 A1 * | 7/1998 |
| KR | 101143359 B1 | 5/2012 |

*Primary Examiner* — Logan M Kraft
*Assistant Examiner* — Joshua Campbell
(74) *Attorney, Agent, or Firm* — Lempia Summerfield Katz LLC

(57) ABSTRACT

A collision accident response system for a vehicle includes: a transparent glass attached to a front surface of the vehicle; a transparent pressure sensor film attached to a rear surface of the transparent glass; and a control unit embedded in the vehicle. The control unit is configured to determine a height and a collision strength of a collision object by a collision pressure detected by the transparent pressure sensor film. As a result, the collision accident response system for a vehicle enables a rapid and accurate response to collision accidents in vehicles equipped with the front glass.

20 Claims, 11 Drawing Sheets

(56) References Cited

U.S. PATENT DOCUMENTS

| | | | |
|---|---|---|---|
| 2004/0066286 A1* | 4/2004 | Stephan | B60R 21/0136 180/274 |
| 2004/0089071 A1* | 5/2004 | Roark | G01H 3/00 73/645 |
| 2004/0185195 A1* | 9/2004 | Anderson | B32B 17/10174 428/49 |
| 2005/0021192 A1* | 1/2005 | Takafuji | B60R 21/0136 701/1 |
| 2005/0119812 A1* | 6/2005 | Marchthaler | B60R 21/0152 701/45 |
| 2012/0176656 A1* | 7/2012 | Boote | B32B 17/10532 359/240 |
| 2014/0285332 A1* | 9/2014 | Delong | G07C 5/085 340/436 |
| 2016/0253850 A1* | 9/2016 | Baumgaertel | B60Q 9/00 701/33.9 |
| 2018/0201257 A1* | 7/2018 | Dudar | B60W 10/184 |

* cited by examiner

<PATTERN DEFINITION THROUGH TRANSPARENT PRESSURE SENSOR DETECTION UNIT>

HORIZONTAL DETECTION UNIT: PASSENGER HEIGHT DEFINITION

IMPACT VALUE: NONE (SMALLER THAN REFERENCE VALUE)
PATTERN: NONE
DETERMINATION: NO IMPACT, E-Call (NO OPERATION)

IMPACT VALUE: SMALLER THAN REFERENCE VALUE
PATTERN: NONE
DETERMINATION: E-Call (NO OPERATION)

IMPACT VALUE: SMALLER THAN REFERENCE VALUE
PATTERN: ADULT FRONTAL OR POSTERIOR HIP
DETERMINATION: E-Call (NO OPERATION, LEVEL OF SIMPLE
CONTACT)

IMPACT VALUE: LARGER THAN REFERENCE VALUE
PATTERN: ADULT FRONTAL, POSTERIOR THIGH/CHILD
          LATERAL SHOULDER JOINT
DETERMINATION: E-Call (ORTHOPEDIC SURGERY FOR
               ADULT AND PEDIATRICS FOR CHILDREN)

IMPACT VALUE: LARGER THAN REFERENCE VALUE
PATTERN: ADULT PASSENGER SIDE HEAD
DETERMINATION: E-Call (NEUROSURGERY FOR ADULT)

COLLISION ACCIDENT RESPONSE SYSTEM AND METHOD FOR A VEHICLE

CROSS-REFERENCE TO RELATED APPLICATION

This application claims priority to and the benefit of Korean Patent Application No. 10-2023-0095244, filed on Jul. 21, 2023, the disclosure of which is incorporated herein by reference in its entirety.

BACKGROUND

Field

The present disclosure relates to a system and method for responding to the occurrence of a collision accident of an unmanned vehicle.

Description of Related Art

An unmanned vehicle such as a purpose built vehicle (PBV) is a vehicle that may travel to a target point by recognizing a traveling environment by itself without a driver's manipulation. An unmanned vehicle may include: a detector for checking its position and recognizing an obstacle; a controller for controlling acceleration, deceleration, steering, or the like; and an actuator for performing an operation required according to a command of the controller, and the like.

Although the unmanned vehicle is becoming more common, it is difficult to quickly identify casualties and cope with a situation in the event of a pedestrian accident outside the vehicle.

In other words, it is impossible to check where and how the pedestrian was injured until emergency rescue personnel arrive.

A front transmissive PBV with transparent glass applied to a front surface of the unmanned vehicle has appeared. However, an issue has occurred where there is no space to separately form a pedestrian accident detector due to the structure of the front glass.

In addition, an emergency call device for transmitting whether an accident has occurred and a position of a vehicle to the police, rescue agencies, or medical institutions in the event of a collision of the vehicle is mounted on the vehicle, further limiting any available space. Additionally, there is a limitation in that the emergency call device needs to be operated by an occupant's intention.

The statements in this section merely provide background information related to the present disclosure and may not constitute prior art.

SUMMARY

The present disclosure has been made in an effort to solve the above problems. Therefore, the present disclosure is directed to providing a system and method for quickly and accurately responding to a collision accident in an unmanned vehicle to which a front glass is applied.

According to one aspect of the present disclosure, a collision accident response system for an unmanned vehicle includes a transparent glass mounted on a front surface of the unmanned vehicle. The collision accident response system also includes a transparent pressure sensor film attached to a rear surface of the transparent glass, and a controller embedded in the unmanned vehicle. The controller is configured to determine a height and a collision strength of a collision object by a collision pressure detected by the transparent pressure sensor film.

In addition, the collision accident response system may further include an emergency call device embedded in the unmanned vehicle to transmit an emergency signal to a rescue center or an emergency medical center by a control command of the controller.

In addition, the controller may be further configured to control the emergency call device to transmit the emergency signal to the rescue center or the emergency medical center when the determined collision strength of the collision object is larger than or equal to a reference value.

In addition, the controller may be further configured to control the emergency call device to transmit the emergency signal to an emergency medical center for an adult or an emergency medical center for a child according to the determined height of the collision object.

A plurality of infrared moving passages may be formed inside the transparent pressure sensor film. An infrared emitting unit of a plurality of infrared emitting units may be formed at one side of an infrared moving passage of the plurality of infrared moving passages. Furthermore, an infrared detection unit of a plurality of infrared detection units may be formed at another side of the infrared moving passage of the plurality of infrared moving passages.

In addition, the controller may be further configured to determine the height of the collision object from the height information of the infrared moving passage connected to the infrared detection unit from which the collision pressure is detected among the plurality of the infrared detection units.

In addition, the controller may be further configured to determine a collision part of the collision object from an infrared reduction intensity of the infrared detection unit from which the collision pressure is detected among the plurality of the infrared detection units.

In addition, the controller may be further configured to determine the collision strength of the collision object from an infrared reduction intensity of the infrared detection unit from which the collision pressure is detected among the plurality of the infrared detection units.

The plurality of infrared moving passages may be arranged to be spaced apart from each other in a longitudinal direction.

In addition, the plurality of infrared moving passages may be arranged to be spaced apart from each other in a lattice form.

The controller may be further configured to determine a collision direction of the collision object from the widths between the plurality of infrared moving passages connected to the plurality of infrared detection units from which the collision pressure is detected and arranged to be spaced apart from each other in a transverse direction.

In addition, the transparent glass and the transparent pressure sensor film may be formed in a curved shape.

In addition, the transparent glass may be double formed, and the transparent pressure sensor film may be positioned (e.g., attached) between the double transparent glass.

In addition, the collision accident response system may further include a projector mounted inside or outside the unmanned vehicle to irradiate an image to the glass side.

Furthermore, the transparent pressure sensor film may detect a touch pressure input to the glass, and the controller may be further configured to control vehicle functions corresponding to the input detected by the transparent pressure sensor film.

In another embodiment, a collision accident response method by the collision accident response system of the unmanned vehicle according to one aspect of the present disclosure is provided. The method includes determining the collision strength of the collision object from an infrared reduction intensity of the infrared detection unit from which the collision pressure is detected among the plurality of the infrared detection units, and determining whether the collision strength of the collision object is larger than or equal to a reference value. The method also includes determining a height of the collision object, and controlling the emergency call device to transmit the emergency signal to an emergency medical center for an adult or an emergency medical center for a child according to the height of the collision object when the collision strength is larger than or equal to the reference value.

In addition, the determining of the height of the collision object may include determining the height of the collision object from height information of the infrared moving passage connected to the infrared detection unit from which the collision pressure is detected among the plurality of the infrared detection units.

In addition, the method may further include determining a collision part of the collision object from an infrared reduction intensity of the infrared detection unit from which the collision pressure is detected among the plurality of the infrared detection units before the controlling of the emergency call device.

In addition, the method may further include determining a collision direction of the collision object from widths between the plurality of infrared moving passages connected to the plurality of infrared detection units from which the collision pressure is detected among the plurality of the infrared detection units and arranged to be spaced apart from each other in a transverse direction before the controlling of the emergency call device.

In the conventional PBV, when a collision accident with a pedestrian occurs, there is no subject to quickly deal with the accident. As a result, it has been challenging to check a pedestrian's condition and timely transport the pedestrian to an appropriate medical institution.

According to the collision accident response system and method of an unmanned vehicle according to the present disclosure, by immediately detecting the type of damage and the damage state in the event of a collision accident in the unmanned vehicle to which the front glass is applied and analyzing the injury pattern of the pedestrian in the event of the accident, it is possible to allow the emergency call device to be operated according to the damage situation.

Therefore, by quickly checking the optimal medical institution and allowing the injured pedestrian to be transported thereto, it is possible to quickly respond to the collision accident.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

For a full understanding of the present disclosure, operational advantages of the present disclosure, and objects to be achieved by practicing the present disclosure, reference should be made to the accompanying drawings, which illustrate embodiments of the present disclosure, and contents described in the accompanying drawings.

When a component, device, element, or the like of the present disclosure is described as having a purpose or performing an operation, function, or the like, the component, device, or element should be considered herein as being "configured to" meet that purpose or to perform that operation or function.

In describing the embodiments of the present disclosure, a description of known techniques or repetitive descriptions that may unnecessarily obscure the gist of the present disclosure have been reduced or omitted.

Figure 1:
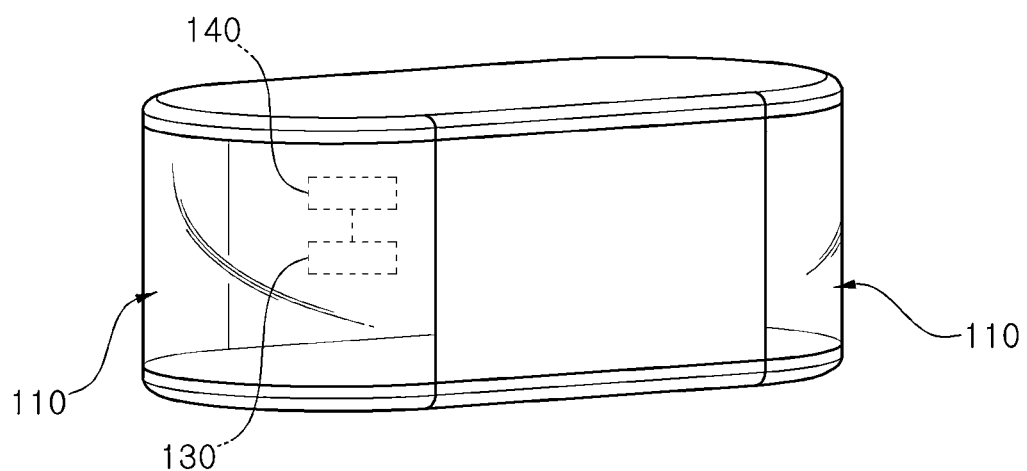
FIG. 1 is a view schematically illustrating a collision accident response system of an unmanned vehicle according to an embodiment of the present disclosure.
Figure 2:
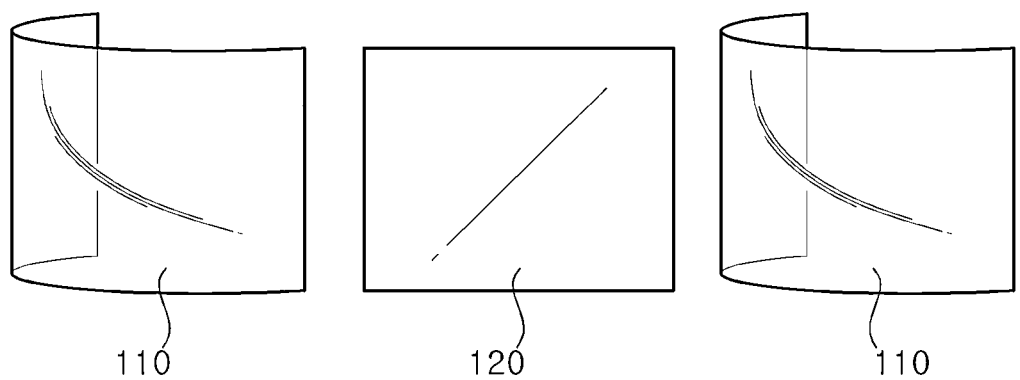
FIG. 2 is an exploded view illustrating a glass and a transparent pressure sensor film of the unmanned vehicle according to an embodiment of the present disclosure.
Figure 3:
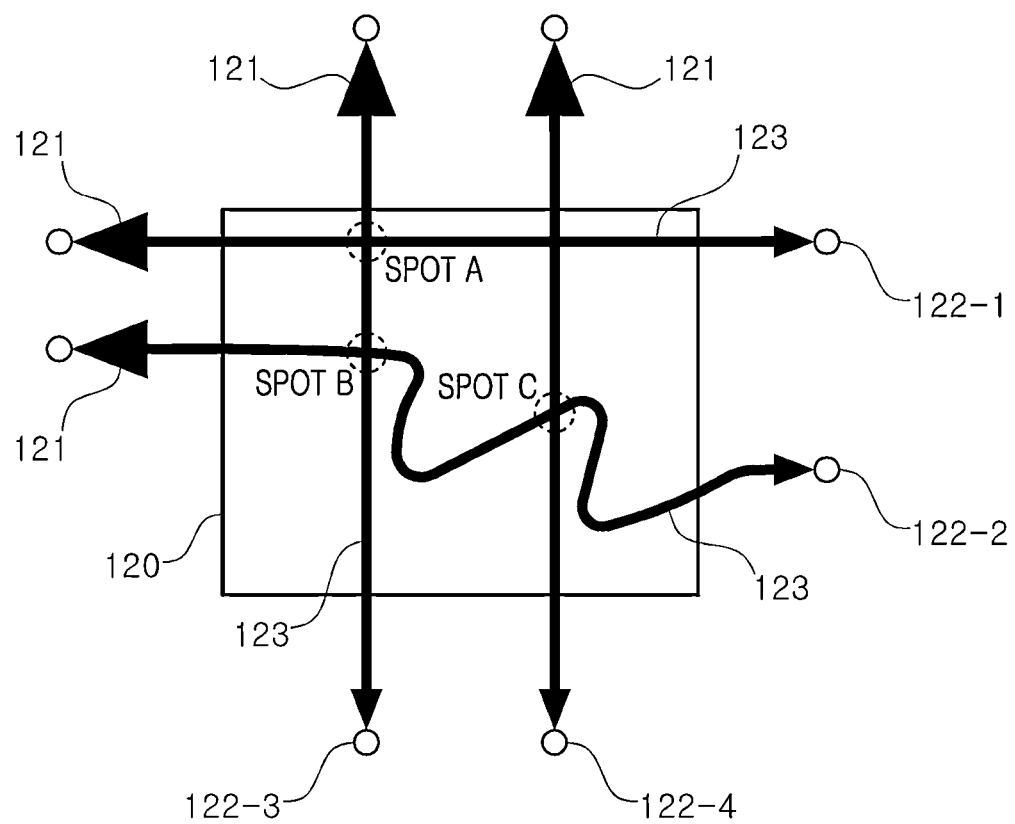
FIG. 3 is a view illustrating an example of an internal structure of the transparent pressure sensor film according to an embodiment of the present disclosure.

FIG. 1 is a view schematically illustrating a collision accident response system of an unmanned vehicle according to the present disclosure. FIG. 2 is an exploded view illustrating a glass and a transparent pressure sensor film of the unmanned vehicle according to the present disclosure. In addition, FIG. 3 is a view illustrating an example of an internal structure of the transparent pressure sensor film according to the present disclosure.

Hereinafter, a collision accident response system and method of an unmanned vehicle according to an embodiment of the present disclosure is described with reference to FIGS. 1-3.

The present disclosure relates to a system and method for taking appropriate measures in the event of a collision accident of an unmanned vehicle, such as a PBV, to which a transparent glass 110 is applied.

As illustrated, a transparent glass 110 may be mounted on a front surface of an unmanned vehicle 10. The glass 110 may also be mounted on a rear surface thereof.

As illustrated in FIG. 2, the glass 110 is double bonded, and a transparent pressure sensor film (e.g., transparent film) 120 is bonded (e.g., positioned) between the double glass 110.

The glass 110 and the transparent pressure sensor film 120 may be formed in a curved shape. After the curved glass 110 is cut and washed, the transparent pressure sensor film 120 is attached to a rear surface of the glass 110 mounted on the front surface. Then the glass 110 that is mounted on the rear surface is attached to the transparent pressure sensor film 120. After initial preload and main pressure processes, an edge of the bonded curved glass 110 and transparent pressure sensor film 120 is sealed.

As described above, clear vision is secured through the transparent glass 110. A collision accident of the unmanned vehicle 10 is detected by the transparent pressure sensor film 120. Additionally, a controller 130 is configured to classify a collision object by the information detected by the transparent pressure sensor film 120 and is configured to determine a degree of injury.

After determining a degree of injury, the controller 130 is configured to provide (e.g., transmit) the information to an appropriate rescue center or emergency medical center based on the collision object and the degree of injury through an emergency call (E-Call) device 140 to enable emergency rescue of an accidental person.

FIG. 3 is a view illustrating an example of an internal structure of the transparent pressure sensor film 120 according to the present disclosure.

In the transparent pressure sensor film 120, since a plurality of infrared moving passages 123 are formed inside the transparent pressure sensor film 120, an infrared emitting unit 121 is formed at one side of the infrared moving passages 123. Each of the infrared detection units 122-1, 122-2, 122-3, and 122-4 is formed at one of the other sides of the infrared moving passages 123. Infrared rays emitted from the infrared emitting units 121 reach the infrared detection units 122-1, 122-2, 122-3, and 122-4 after passing through the infrared moving passages 123.

When no pressure acts on the transparent film 120, all of the emitted infrared rays reach the detection units. However, when pressure is generated on the transparent film 120, only some of the emitted infrared rays reach the infrared detection units 122-1, 122-2, 122-3, and 122-4 to detect the pressure. This means that the lower the intensities of the infrared rays reaching the infrared detection units 122-1, 122-2, 122-3, and 122-4 are, the higher the applied pressure is.

In FIG. 3, when pressure is applied to spot A, infrared rays detected by the two infrared detection devices 122-1 and 122-3 decrease. Additionally, when pressure is applied to spot B, the amount of detected infrared rays of the two infrared detection units 122-2 and 122-3 also decreases. In addition, when pressure is applied to spot C, infrared rays detected by the two infrared detection units 122-2 and 122-4 decrease. Additionally, the infrared rays are detected according to the characteristics of light when the film is bent (when the infrared moving passage is curved). In other words, as described above, even when the infrared moving passage 123 is bent, the infrared rays may move, and thus the pressure may be detected.

As described above, a pressure generation point is defined by the positions of the infrared detection units 122-1 to 122-4 in which the infrared rays decrease. Additionally, the magnitude of the pressure is detected according to the magnitudes of the detected infrared rays.

Figure 4:
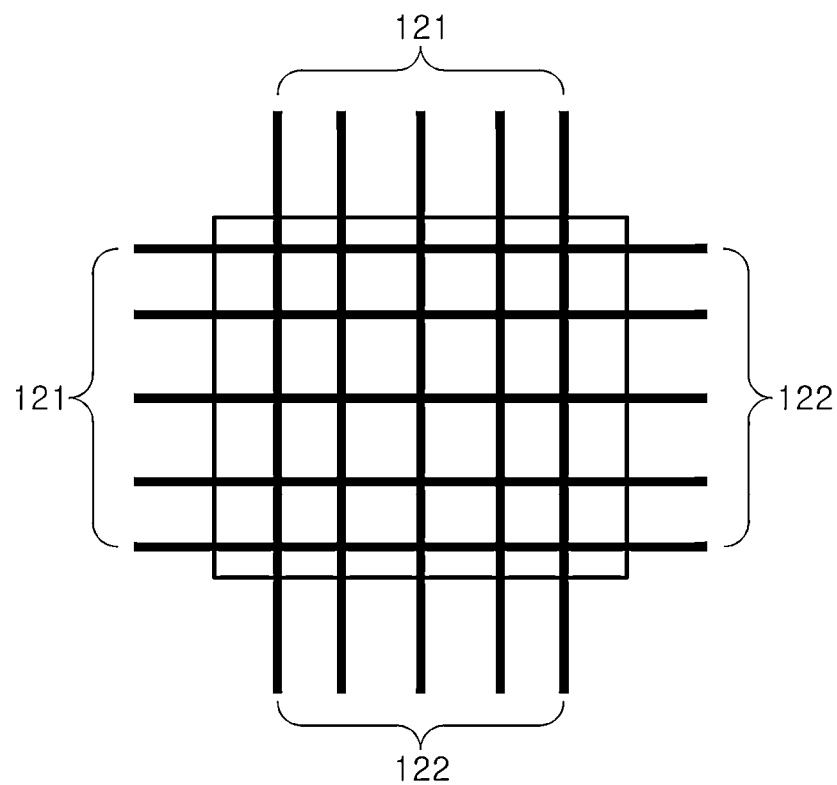
FIG. 4 is a view illustrating a simplified internal structure of the transparent pressure sensor film according to an embodiment of the present disclosure.
Figure 5:
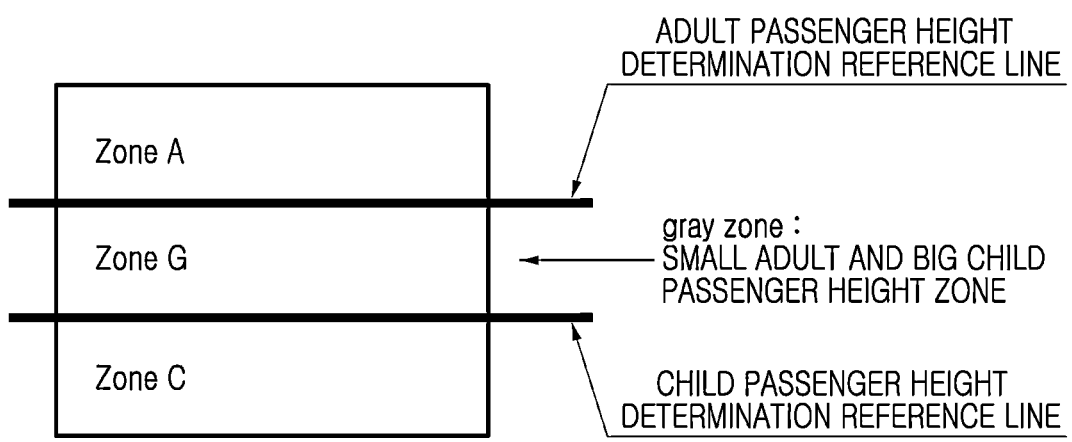
FIG. 5 is a view illustrating a classification of passenger type determination zones according to a position of a detection unit in an embodiment of the present disclosure.

FIG. 4 is a view illustrating the simplified internal structure of the transparent pressure sensor film 120 according to the present disclosure. FIG. 5 is a view illustrating a classification of passenger type determination zones according to a position of a detection unit.

In other words, the controller 130 may determine the type of a collision object by the position of the infrared detection unit 122 in which the infrared rays decrease. In the case of a person, a height of the person may be determined through the classification of passenger type determination zones as illustrated in FIG. 5.

For example, Zone C may be mapped to a standard height of a 10-year-old child in the corresponding country. In addition, since Zone A may be defined based on the adult passenger standard in the corresponding country, an emergency call (E-Call) is operated (e.g., transmitted, called, or the like) to an adult hospital when pressure is detected in Zone A. In addition, when pressure is detected in Zone C, the E-Call is operated to the children's hospital, and when pressure is detected in Zone G, the E-Call is operated to both the adult hospital and the children's hospital. Zone G may be defined by a separate E-Call in consideration of the conditions of each country.

Figure 6:
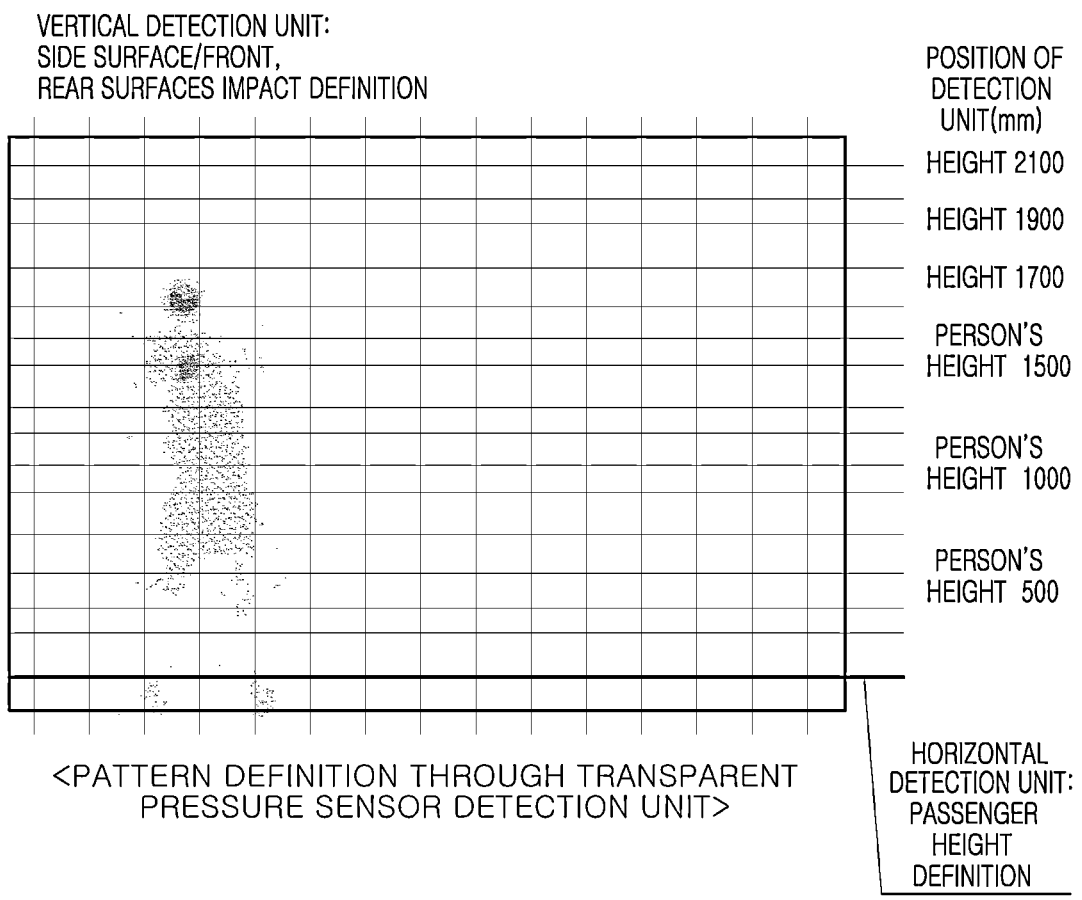
FIG. 6 is a view illustrating an example of defining a collision pattern by the detection unit of the transparent pressure sensor film, according to an embodiment of the present disclosure.

Next, FIG. 6 is a view illustrating an example of defining a collision pattern by the detection unit of the transparent pressure sensor film 120 according to the present disclosure is defined. As illustrated in FIG. 6, a height may be determined depending on the positions of the infrared detection units, and the collision strength (e.g., collision intensity) may be determined by the detected pressure.

In other words, a height of an accidental person may be defined through an infrared detection unit connected to a horizontal infrared moving passage 123. Additionally, it is possible to ascertain whether the collision occurred on a side of the accidental person, such as a front or rear collision of the accidental person, may be defined through the infrared detection unit connected to the vertical infrared moving passage 123.

In other words, calculating the detection amount of the horizontal detection unit means calculating height information of an injured person through a position of the detection unit in which a detection value is generated. For example, when a height zone detection value of 1700 is generated, a height of an injured passenger is defined as 1700 mm.

Furthermore, an injured part may be checked through the position of the detection unit using the body standard proportion model of each country. For example, when the position of the detection unit is 800, e.g., 800/1700=47%, it may be determined to be a femoral region based on the body standards in Korea.

Next, the calculation of the detection amount of the vertical direction detection unit defines side, front, and rear collision directions through a width of the vertical direction detection unit in which the detection value is generated. For example, when the width of the detection unit is 200, it may be determined to be a side impact, and when the width of the detection unit is 400, it may be determined to be a front or rear impact.

Furthermore, it may be determined that injury has occurred upon determining whether the detection amount of the pressure sensor is larger than or equal to a reference value.

As described above, by determining the body information of the accidental person, a magnitude of an impact for each body part, and whether the side, front, or rear collision occurs and classifying the accidental person, the E-Call may be operated to the adult hospital or the children's hospital.

Furthermore, the E-Call may be operated to the neurological surgery department or the orthopedic surgery department by checking the position (e.g., location) of the injury.

Figure 7:
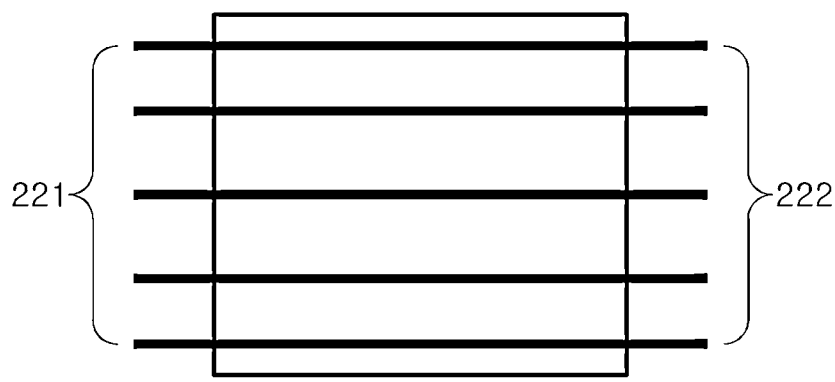
FIG. 7 is a view illustrating an example of the internal structure of the transparent pressure sensor film according to an embodiment of the present disclosure.
Figure 8:
FIG. 8 is a view illustrating an example of defining a collision pattern through the detection unit of the transparent pressure sensor film of FIG. 7.

As a modified example, as illustrated in FIGS. 7 and 8, only a horizontal detection unit may be formed by an infrared emitting unit 221 and an infrared detection unit 222 to determine a height and body part of the accidental person. This can result in cost savings compared to the above-described example.

Next, FIGS. 9-13 are views illustrating that patterns through the detection unit of the transparent pressure sensor film according to the present disclosure are exemplified according to impact values.

The detection value of the transparent pressure sensor film 120 bonded between the glasses 110 is mapped to a position and magnitude of the impact in the controller 130 to determine whether an accident has occurred.

The type of injury and injured part of an accidental person, such as an adult or a child, and the posture of the accidental person in the event of an impact are checked through the position of the impact. Thus, whether an accident has occurred and whether the E-Call is operated is determined by the magnitude of the impact.

Figure 9:
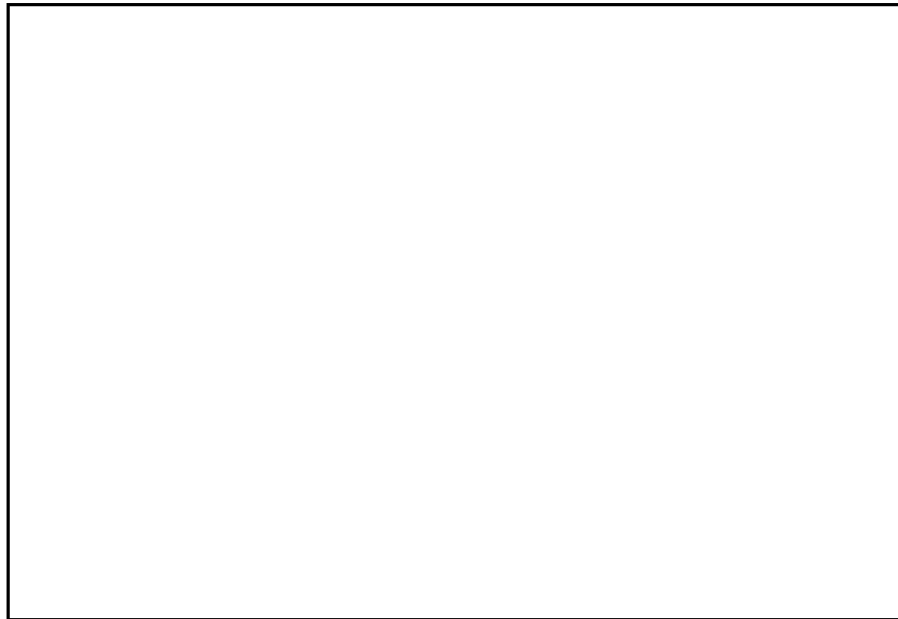
FIGS. 9-13 are views illustrating that patterns through the detection unit of the transparent pressure sensor film according to the present disclosure are exemplified according to impact values.

FIG. 9 illustrates a case in which there is no impact value and no pattern formation. As a result, it is determined that there is no impact and thus the E-Call is not operated.

Figure 10:
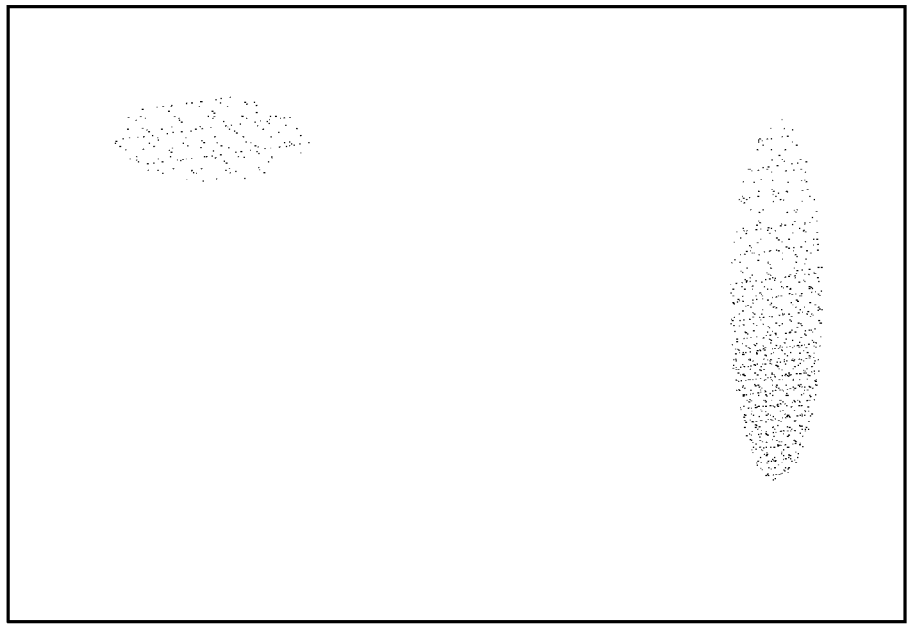

FIG. 10 illustrates a case in which the impact value is smaller than a reference value and there is no pattern formation. As a result, the E-Call is not operated.

Figure 11:
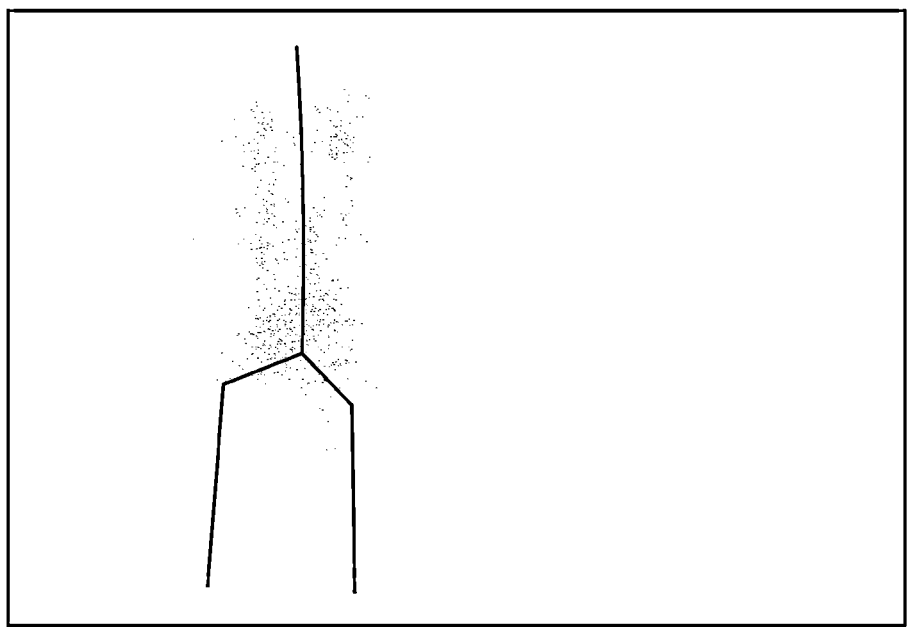

FIG. 11 illustrates a case in which the impact value is smaller than the reference value, and a pattern of a frontal or posterior hip of an adult is formed. As a result, it is determined to be the level of simple contact and thus the E-Call is not operated.

Figure 12:
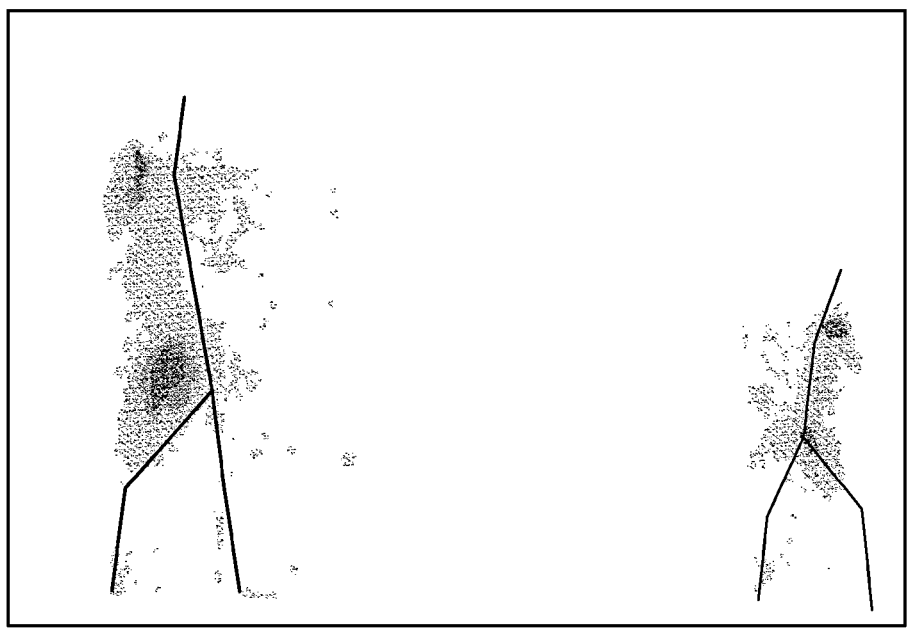

In addition, FIG. 12 illustrates a case in which the impact value exceeds the reference value, and patterns of an adult frontal or posterior thigh and a child lateral shoulder joint are formed. The E-Call may be operated to the orthopedic surgery department for an adult and the pediatrics department for a child.

Figure 13:
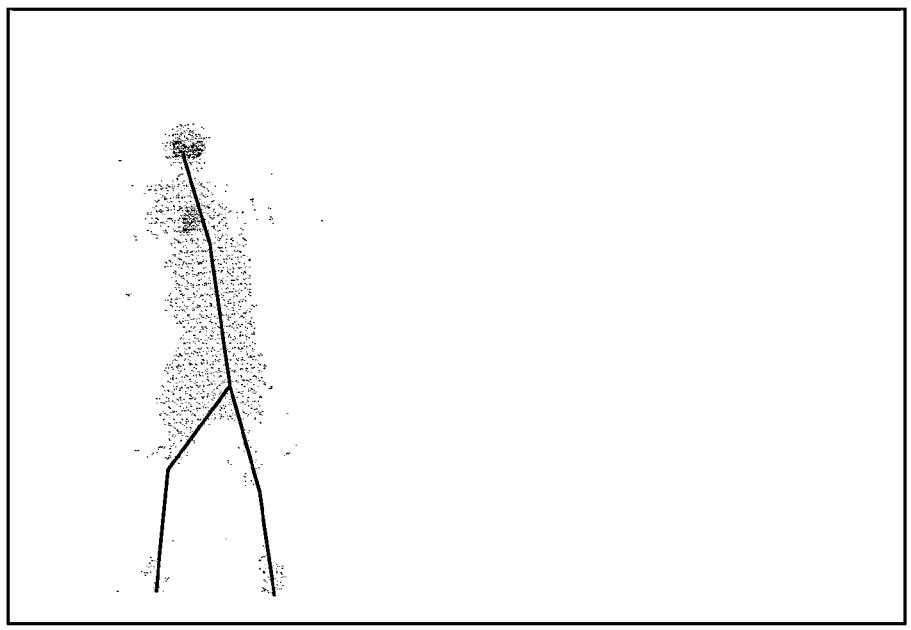

Next, FIG. 13 illustrates a case in which the impact value exceeds the reference value, and a pattern of lateral head injury of an adult is formed. In this case, the E-Call may be operated to the neurological surgery department for an adult.

Furthermore, the detection of passengers and the postures of the passengers at the time of impact may be refined through image-based object recognition techniques such as a convolutional neural network (CNN), a recurrent neural network (RNN), a generative adversarial network (GAN), and a you only look once (YOLO) in addition to directly controlling values detected through sensors.

In other words, it is possible to build a server by extracting injury characteristics according to the type of passenger and the amount of impact (controlled by an impact speed). It is also possible to build a server by generating a machine learning model for object recognition along with an initial database (DB). In this configuration, an input becomes the amount of impact and the position of the impact, and an output becomes the type of passenger and injury pattern.

Thereafter, in the event of a field accident, the type of passenger and the amount of impact may be determined depending on the DB. The data after the accident may be updated in the DB of the server.

Figure 14:
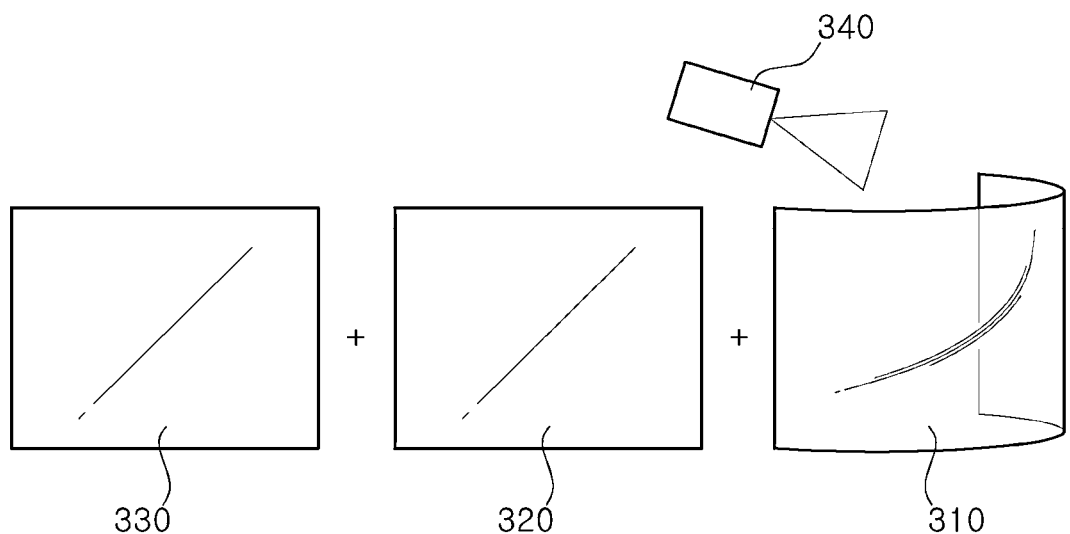
FIG. 14 is an exploded view illustrating a glass and a transparent pressure sensor film of an unmanned vehicle according to another embodiment of the present disclosure.
Figure 15:
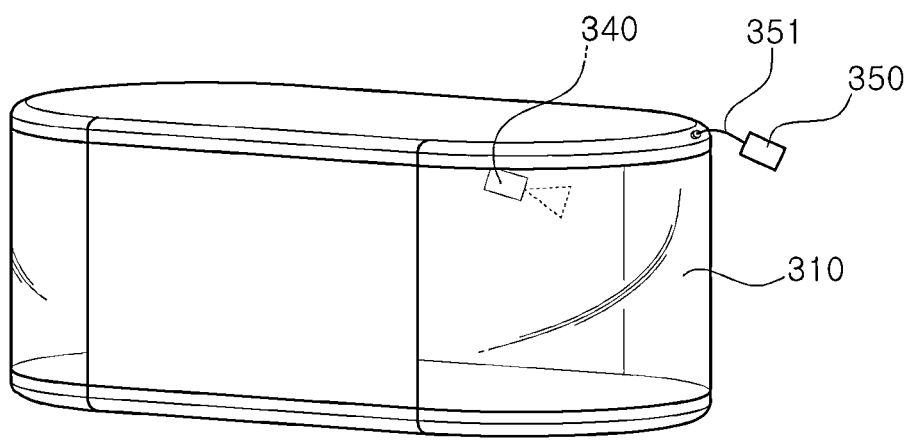
FIG. 15 is a view schematically illustrating a collision accident response system of an unmanned vehicle according to another embodiment of the present disclosure.

Next, FIG. 14 is an exploded view illustrating a glass and a transparent pressure sensor film of an unmanned vehicle according to another embodiment of the present disclosure. FIG. 15 is a view schematically illustrating a collision accident response system of an unmanned vehicle according to another embodiment of the present disclosure.

In an unmanned vehicle according to another embodiment, a transparent pressure sensor film 320 is attached to a rear surface of a glass 310 instead of a double glass. Additionally, a protective film 330 is fused to a rear surface of the transparent pressure sensor film 320 to maintain its shape.

In addition, an internal projector 340 may be mounted inside the vehicle or an external projector 350 may be mounted outside the vehicle.

Therefore, an accident is detected by the transparent pressure sensor film 320 upon excessive pressure (in the event of an accident). The vehicle functions may be executed through the transparent pressure sensor film 320 when the vehicle is traveling without encountering any accidents.

In other words, input information is irradiated to the glass 310 by the projectors 340 and 350, and the transparent pressure sensor film 320 detects the touch input. As a result, it is possible to generate a menu and execute vehicle functions such as air conditioning, lighting, and traveling mode.

When the internal projector 340 is mounted, a roof structure may be directly fastened thereto. Additionally, when the external projector 350 is mounted, a mounting structure using a separate bracket 351 may be applied thereto.

Although the present disclosure has been described above with reference to the drawings, the present disclosure is not limited to the described embodiments. Furthermore, it should be apparent to those having ordinary skill in the art that various modifications and changes can be made without departing from the spirit and scope of the present disclosure. Therefore, these modified examples or changed examples should be included in the claims of the present disclosure, and the scope of the present disclosure should be construed based on the appended claims.

What is claimed is:

1. A collision accident response system of a vehicle, comprising:
   a transparent glass mounted on a front surface of the vehicle;
   a transparent pressure sensor film attached to a rear surface of the transparent glass; and
   a controller embedded in the vehicle and configured to determine a height and a collision strength of a collision object by a collision pressure detected by the transparent pressure sensor film.

2. The collision accident response system of claim 1, further comprising an emergency call device embedded in the vehicle to transmit an emergency signal to a rescue center or an emergency medical center by a control command of the controller.

3. The collision accident response system of claim 2, wherein the controller is further configured to control the emergency call device to transmit the emergency signal to the rescue center or the emergency medical center when the determined collision strength of the collision object is larger than or equal to a reference value.

4. The collision accident response system of claim 3, wherein the controller is further configured to control the emergency call device to transmit the emergency signal to an emergency medical center for an adult or an emergency medical center for a child according to the determined height of the collision object.

5. The collision accident response system of claim 1, wherein a plurality of infrared moving passages are formed inside the transparent pressure sensor film, wherein an infrared emitting unit of a plurality of infrared emitting units is formed at one side of an infrared moving passage of the plurality of infrared moving passages, and wherein an infrared detection unit of a plurality of infrared detection units is formed at another side of the infrared moving passage of the plurality of infrared moving passages.

6. The collision accident response system of claim 5, wherein the controller is further configured to determine the height of the collision object from height information of the infrared moving passage connected to the infrared detection unit from which the collision pressure is detected among the plurality of infrared detection units.

7. The collision accident response system of claim 6, wherein the controller is further configured to determine a collision part of the collision object from an infrared reduction intensity of the infrared detection unit from which the collision pressure is detected among the plurality of infrared detection units.

8. The collision accident response system of claim 5, wherein the controller is further configured to determine the collision strength of the collision object from an infrared reduction intensity of the infrared detection unit from which the collision pressure is detected among the plurality of infrared detection units.

9. The collision accident response system of claim 5, wherein the plurality of infrared moving passages are arranged to be spaced apart from each other in a longitudinal direction.

10. The collision accident response system of claim 5, wherein the plurality of infrared moving passages are arranged to be spaced apart from each other in a lattice form.

11. The collision accident response system of claim 10, wherein the controller is further configured to determine a collision direction of the collision object from widths between the plurality of infrared moving passages connected to the plurality of infrared detection units from which the collision pressure is detected and arranged to be spaced apart from each other in a transverse direction.

12. The collision accident response system of claim 5, wherein the transparent glass and the transparent pressure sensor film are formed in a curved shape.

13. The collision accident response system of claim 1, wherein the transparent glass is double formed, and wherein the transparent pressure sensor film is positioned between the double transparent glass.

14. The collision accident response system of claim 1, further comprising a projector mounted inside or outside the vehicle to irradiate an image to a glass side.

15. The collision accident response system of claim 14, wherein the transparent pressure sensor film detects a touch pressure input to the transparent glass, and the controller is further configured to control vehicle functions corresponding to the input detected by the transparent pressure sensor film.

16. A collision accident response method by a collision accident response system, where the collision accident response system includes a transparent glass mounted on a front surface of a vehicle; a transparent pressure sensor film attached to a rear surface of the transparent glass; and a controller to determine a height and a collision strength of a collision object by a collision pressure detected by the transparent pressure sensor film, the method comprising:
  determining the collision strength of the collision object from an infrared reduction intensity of an infrared detection unit from which the collision pressure is detected among a plurality of infrared detection units;
  determining whether the collision strength of the collision object is larger than or equal to a reference value;
  determining a height of the collision object; and
  controlling an emergency call device to transmit an emergency signal to an emergency medical center for an adult or an emergency medical center for a child according to the height of the collision object when the collision strength is larger than or equal to the reference value.

17. The method of claim 16, wherein the determining of the height of the collision object includes determining the height of the collision object from height information of the infrared moving passage connected to the infrared detection unit from which the collision pressure is detected among the plurality of infrared detection units.

18. The method of claim 16, further comprising determining a collision part of the collision object from an infrared reduction intensity of the infrared detection unit from which the collision pressure is detected among the plurality of infrared detection units before the controlling of the emergency call device.

19. The method of claim 16, further comprising determining a collision direction of the collision object from widths between the plurality of infrared moving passages connected to the infrared detection units from which the collision pressure is detected among the plurality of infrared detection units and arranged to be spaced apart from each other in a transverse direction before the controlling of the emergency call device.

20. A collision accident response method, the method comprising:
  determining, by a controller of a collision accident response system, a collision strength of a collision object from an infrared reduction intensity of an infrared detection unit from which a collision pressure is detected among a plurality of infrared detection units;
  determining, by the controller, whether the collision strength of the collision object is larger than or equal to a reference value;
  determining, by the controller, a height of the collision object; and
  controlling, by the controller, an emergency call device to transmit an emergency signal to an emergency medical center for an adult or an emergency medical center for a child according to the height of the collision object when the collision strength is larger than or equal to the reference value.

* * * * *